Patented Aug. 29, 1939

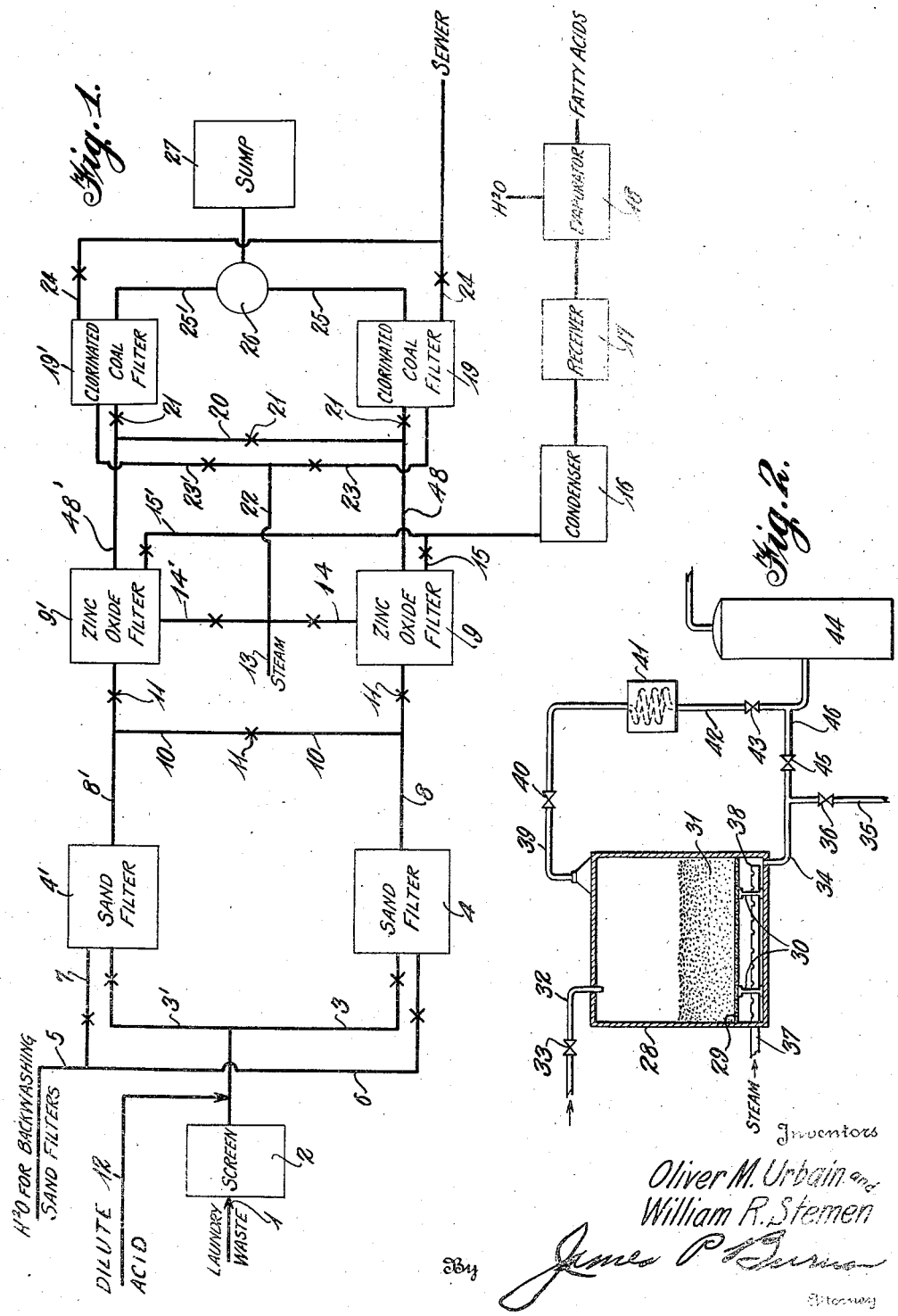

2,171,197

UNITED STATES PATENT OFFICE 2,171,197

PROCESS FOR PURIFICATION OF LAUNDRY WASTE

Oliver M. Urbain and William R. Stemen, Columbus, Ohio, assignors to Charles H. Lewis, Harpster, Ohio Application February 13, 1937, Serial No. 125,665

6 Claims. (Cl. 210—2)

This invention relates to a process for the purification of laundry waste and has for its object the provision of a simple and advantageous process through the medium of which the highly putrescible waste from laundries can be completely purified and an effluent obtained in the form of sparkling clear water that may be either reused in the laundry or directly discharged into the receiving stream since it presents no further contaminating problem.

To the end that the purposes and objects of the invention may be made more clearly apparent, brief reference to the nature of the problem will first be made.

The water used for laundry purposes is first softened usually by either the zeolite method or the lime-soda-ash method. A water having a zero hardness content is to be desired since the lower the hardness content, the greater the saving in soap costs, which represent one of the largest items of expense in the operation of power laundries, exclusive of course of the cost of labor.

The materials washed in a laundry are usually run through from four to six progressive changes of suds, which constitutes the actual washing operation. After this treatment of the materials in the suds, they are run through from five to seven progressive changes of rinse water. The temperature of the suds water is usually maintained around 160° F. while the temperature of the rinse water is ordinarily around 150° F.

In addition to the soaps employed in the formation of the suds, so-called soap builders are also employed to aid the soaps in removing the dirt from the materials washed. The soap builders are alkaline in reaction and usually consist of sodium silicate, trisodium phosphate, sodium carbonate, or like materials. When the materials washed require bleaching, a small quantity of such bleaching agents as sodium hypochlorite or sodium fluoride is added. Small quantities of aniline and starch are also usually employed in both the washing and the rinsing steps.

From the foregoing it is evident that the laundry waste carries a great variety of substances, both organic and inorganic. In addition to all of the soaps and chemicals that are employed in the washing and rinsing operations, the waste also contains the dirt removed from the material washed as well as a multitude of various types of bacteria. Roughly, about 45% of the waste waters discharged by laundries originates from the washing or suds solution while the remaining 55% originates in the rinsing operation.

The wash waters or suds usually contain from 0.25 gram to 5.0 grams of fatty acids per liter. Fatty acids are, of course, present in the form of sodium or potassium salts, that is, in the form of soaps. Besides the soaps, the waste also contains the so-called soap builders, free alkali, dirt of many descriptions, dyes, greases, starch, carbohydrates, lint, and other cellulosic materials, as well as many types of bacteria including some pathogenic varieties.

The hydrogen ion concentration of the suds waters expressed in terms of the pH scale varies from around pH 8.1 to pH 13.8, while the pH of the rinse waters will vary from around pH 7.0 to pH 8.6. The ten-day biological oxygen demand of a typical laundry waste will vary from 220 parts per million to 900 parts per million. The waste, it will therefore be appreciated, is of a highly putrescible character and constitutes a serious problem in the successful operation of a municipal sewage treating plant operating on biological principles. In fact laundry waste presents such a serious problem that in many cities no attempt is made to treat the same in the sewage disposal plant.

Soaps exist in the laundry waste in the form of semi-colloids. These soaps hydrolyze rather freely even in strong solutions. When one makes an ultrafiltration of a soap solution, the fatty acid formed as a result of the hydrolysis of the soap will pass freely through the colloidal membrane while the unhydrolyzed soap portion is retained on the membrane. This establishes the fact that the soaps do hydrolyze freely and that they do exist in solution as semi-colloids. Additionally the soaps in the laundry waste act as protective colloids, stabilizing fine suspensions which otherwise would not exhibit colloidal properties. In other words, the soaps peptize other substances and thus materially complicate the colloidal structure of the waste.

It is, therefore, evident that when the soaps are removed from laundry waste, the colloidal structure of the waste is more or less completely shattered since the soaps constitute a stabilizing factor controlling the entire colloidal structure of the waste.

The present process is concerned with effecting hydrolysis of the soaps to free their fatty acid content and to then remove the fatty acids from the waste, thus destroying the stabilizing factor due to the presence of the soap, and finally removing the remaining organic matter from the waste.

Coming now to a description of our process, reference will be made, for purposes of clarification, to the accompanying drawing in which:

Figure 1 is a diagrammatic flow chart illustrating the manner of carrying out the process; and Figure 2 is a detail diagrammatic illustration of an appropriate construction for use in the principal filtering steps of the process.

Inasmuch as it is necessary to effect hydrolysis of the soaps in the laundry waste in order to free the fatty acid content thereof, we will first briefly refer to this procedure. When a dilute acid, such for example as dilute hydrochloric acid, is added to laundry waste, the fatty acids are released from the soaps in accordance with the general reaction which follows:

$$\underset{\text{Soap}}{R.COO.Na} + HCl \rightarrow \underset{\text{Fatty acid}}{R.COOH} + NaCl$$

A specific example of the general reaction above is given as follows:

$$\underset{\text{Sodium stearate}}{C_{17}H_{35}.COO.Na} + HCl \rightarrow \underset{\text{Stearic acid}}{C_{17}H_{35}.COOH} + NaCl$$

The above reactions take place at all pH's below ph 7.0, but even at pH's above pH 7.0 the soaps hydrolyze according to the following general reaction:

$$\underset{\text{Soap}}{R.COO.Na} + H_2O \rightleftarrows \underset{\text{Fatty acid}}{R.COOH} + NaOH$$

It should be noted that this reaction is of the reversible type. If the fatty acid formed on the right is removed, the hydrolysis of the soap will proceed to completion. In other words, as long as the pressure is eliminated from the right side of the reaction, it will continue to move to the right.

A specific example of the hydrolysis of a soap is given in the following reaction:

$$\underset{\text{Sodium palmitate}}{C_{15}H_{31}.COO.Na} + H_2O \rightleftarrows \underset{\text{Palmitic acid}}{C_{15}H_{31}.COOH} + NaOH$$

In accordance with our process, we effect removal of the fatty acids as fast as released from the soaps by hydrolysis so that the hydrolysis reaction continues to completion.

Referring now to Figure 1, the laundry waste is first supplied through the line 1 to a suitable screening unit 2 of conventional design to remove solids therefrom. From the screening unit 2, the waste is passed through the line 3, 3' to one of the alternate parallel sand filters 4, 4', also of conventional form, wherein additional solids are removed from the waste to prevent fouling of the subsequent filters. The sand filters 4, 4' are adapted to be alternately employed, and a water line 5 with suitable connections 6 and 7 is provided for back-washing the sand filter not in use. From the sand filter 4 or 4', the waste freed from the solids removed by the screening unit 2 and the sand filter is thence passed through the line 8 or 8' to the fatty acid removing filter 9 or 9'. The cross connection 10 between the lines 8 and 8' and the valves 11 provide for selective passage of the waste from either sand filter 4 or 4' to either of the filters 9 or 9'.

The nature of the filtering medium employed for removing the fatty acids constitutes an important feature of the present invention. In the present process, the filtering medium employed of the filters 9 and 9' for effecting removal of the fatty acids released from the soaps as a result of hydrolysis due to the addition of the dilute acid through the line designated 12 constitutes a filtering medium of high surface area impregnated with zinc oxide.

Zinc oxide has a solubility of 0.001 gram in 100 cc. of water at 20° C. at the saturation point so obviously very little of this reagent will be lost upon passage of the laundry waste through the filter 9 or 9'. The carrier for the zinc oxide may preferably constitute either hard coke or magnesia silicate brick. Both of these materials have an enormous surface area and are both extremely porous and relatively inert chemically. Additionally they will both withstand high temperatures and yet maintain their physical structures. The filtering medium is preferably employed in the form of a granular mass, the individual granules of which will pass a five-mesh screen and be retained upon a twenty-mesh screen.

To obtain the filtering medium impregnated with zinc oxide, the carrier may be pickled in a saturated solution of zinc nitrate until the granules of the carrier are thoroughly saturated with the reagent. The excess reagent is then drawn off, and the granulated mass is dried in a current of warm air at about 120° C. and then ignited at a temperature ranging from 600° to 900° C. At this temperature the zinc nitrate is converted to zinc oxide. Zinc chloride may be used in the preparation of the filtering medium in lieu of zinc nitrate. Obviously, regardless of the source from which the medium is derived, the active agent in the filter constitutes zinc oxide.

It will thus be observed that the filtering agent in the filters 9 and 9' is made up of a granular mass impregnated with zinc oxide.

As has been pointed out above, when a dilute acid, such for example as dilute hydrochloric acid, is added to laundry waste, the fatty acids are released from the soaps. This acid may be added to the laundry wastes either before or after the wastes are passed through the sand filters. In Figure 1, the dilute acid is added through line 12 after the laundry wastes have been screened.

Bearing in mind that, due to the addition of the dilute acid, the soaps in the waste are undergoing hydrolysis at the time the solution reaches the filter 9 or 9' and there is thus present in the waste free fatty acid, the following reaction takes place in the filter:

$$\underset{\text{Fatty acid}}{ZnO + 2R.COOH} = \underset{\substack{\text{Zinc salt of}\\\text{fatty acid}}}{Zn(OOCR)_2} + H_2O$$

From the above reaction, it is seen that there is formed on the surface of the granules in filters 9 and 9' a zinc salt of the fatty acids. When the material has become exhausted, it can be regenerated and the fatty acids released by passing superheated steam through the material. The reaction is as follows:

$$\underset{\substack{\text{Zinc salt of}\\\text{fatty acid}}}{Zn(OOCR)_2} + \underset{\text{Steam}}{H_2O} = ZnO + \underset{\text{Fatty acid}}{2R.COOH}$$

It should be noted that the first reaction is dependent upon the speed of the hydrolysis of the fatty acid salts, but since we are removing the fatty acids as fast as they are released by hydrolysis, the hydrolysis reaction proceeds with great rapidity and the whole procedure requires less than fifteen minutes, provided of course that the ZnO is at all times in excess of the fatty acid content. The regeneration of the filter is complete within a period of a few minutes as hot steam breaks down the zinc salts of the fatty acids very readily and very easily.

In the drawing we have disclosed a steam line 13 having connections 14 and 14' for supplying steam to the filters 9 and 9', respectively, for the purpose of driving out the fatty acids. The steam carrying the fatty acids passes through the filters 9 and 9', through the lines 15 and 15' respectively to a suitable condenser 16, and thence to a receiver 17 and finally to an evaporator 18 wherein the water may be separated and the fatty acids recovered.

Returning now to the remaining waste constituting the filtrate leaving the filters 9 and 9', this fatty acid free material is next passed through the line 48 or 48' to the chlorinated coal filter 19 or 19', a cross connection 20 and suitable valves 21 permitting alternate use of the filters 19 and 19'.

The chlorinated coal constituting the filtering medium with which the filters 19 and 19' are charged may be prepared in accordance with the teachings contained in United States Patent No. 2,029,962, issued to us on February 4, 1936. The chlorinated coal filter functions to remove the remaining organic polluting substances from the waste. The steam line 13 is provided with an extension 22 and connections 23, 23' for supplying steam to the filters 19 and 19' for purposes of regenerating these filters. The filtrate from filters 19 and 19' constitutes a completely purified effluent and is discharged through the lines 24 or 24' either to the sewer or for recirculation as a fresh water supply for the laundry.

The steam that is introduced to the filters 19 and 19' for the purpose of regenerating the same passes out through the lines 25 or 25' to a suitable condenser 26, and the resultant water carrying the organic matter and substances removed from the filters 19 and 19' is discharged into a suitable sump 27 where it may be subjected to further treatment and from where, after a time period of oxidation, it may also be discharged into the sewer since it will no longer have any substantial biochemical oxygen demand.

It is not believed necessary to a thorough understanding of the process to disclose specific apparatus structures since all of the various apparatus elements are of conventional design. The filters 9, 9', 19, and 19' may all be of identical construction. For purposes of illustration, an appropriate filter construction which may be employed for these four filters is shown in Figure 2 wherein the main filter chamber 28 is a sheet metal container and is provided with an interior grate 29 supported by suitable supports 30 and carrying the filtering medium 31. The waste is adapted to be supplied through the line 32 controlled by the valve 33, and the filtrate is discharged through the line 34 and thence through the branch line 35 controlled by a suitable valve 36. A steam line 37 provided with a perforated extension 38 extends into the bottom of the chamber 28 and serves to supply steam for the regeneration of the filtering medium. The steam carrying the fatty acids remaining in the filters 9 or 9' and the organic substances removed from the chlorinated coal filters 19 and 19' may pass out through the line 39 controlled by a suitable valve 40 to the condenser 41.

In the case of the filters 9 and 9', the condenser 41 may discharge through a line 42 controlled by a suitable valve 43 into an appropriate evaporator 44 for recovery of the fatty acids. Additionally, during the time the steam is supplied, some condensation may occur in the filtering medium 31 carrying with it recoverable fatty acids. This condensate may, by closing the valve 36 and opening valve 45, be supplied through the branch line 46 to the evaporator along with the condensate from the condenser 41.

It will be understood that the invention of the present application is a process and that the apparatus is merely diagrammatically illustrated for the purpose of lending clarification to the description of the process and that the invention is not to be limited to the employment of any particular apparatus.

To give some idea of the capabilities of the process, the requirements of a laundry discharging up to fifty thousand gallons of waste per day can be met through the employment of filters corresponding to the filters 9, 9', 19, and 19', not substantially larger than four feet in diameter and ten feet in height. In use, these filter chambers are not subjected to any extreme pressure forces or to excessive temperatures and, therefore, can be produced at a minimum cost. The condensers for handling the steam and contained substances issuing from the filter chambers 9, 9', 19, and 19' need not be excessively large, for a laundry discharging up to fifty thousand gallons of waste per day, since the condensates taken off from these filters will not exceed around four hundred gallons each.

The fatty acids recovered as an incident to the process render the purification process a profitable procedure rather than an economic burden.

It is to be understood that the foregoing description is illustrative only and is not to be considered in a limiting sense, the invention being comprehended by the appended claims.

Having thus described our invention, what we claim is:

1. A process for purifying laundry waste comprising initially removing suspended solids from the waste, effecting hydrolysis of the soap solution, passing the solution through a filter charged with zinc oxide to remove through chemical reaction the fatty acids freed by the hydrolysis, and thence passing the fatty acid free solution through a chlorinated coal filter to effect removal of remaining organic matter therefrom.

2. A process for purifying laundry waste comprising screening and filtering the waste to remove solids, adding a dilute acid capable of effecting hydrolysis of the soap solution, passing the solution through a filter charged with zinc oxide to remove through chemical reaction fatty acids as freed by the hydrolysis reaction, then subjecting the fatty acid free solution to the action of chlorinated coal to remove further organic compounds, and finally discharging the purified effluent.

3. A process for purifying laundry waste comprising first removing solids from the waste, hydrolyzing the soap solution in the waste, removing the fatty acids by passing the waste through a filter charged with zinc oxide and subsequently passing the residual liquids through a filter charged with chlorinated coal.

4. A process for purifying laundry waste comprising passing the waste through instrumentalities capable of physically separating solids therefrom, hydrolyzing the soap solution contained therein removing the fatty acids by passing the waste through a filter composed of inert granular material charged with zinc oxide, and finally passing the solution through a second filter containing chlorinated coal.

5. A process for obtaining purified liquids from laundry waste which comprises passing said waste through a screen to remove solids therefrom, acidifying to free fatty acids by hydrolysis of the soap solution contained therein, filtering to remove suspended particles, removing fatty acids by reaction with zinc oxide, and removing soluble organic impurities by means of chlorinated coal.

6. A process for removing organic and inorganic impurities from laundry waste comprising the steps of acidifying to hydrolyze the soap solution, filtering to remove solid materials, contacting with zinc oxide to chemically remove fatty acids therefrom, and filtering through chlorinated coal to remove soluble organic impurities.

OLIVER M. URBAIN.
WILLIAM R. STEMEN.